Jan. 24, 1967  E. C. DOME  3,299,447
SUSPENSION SYSTEM FOR MATTRESSES AND THE LIKE
Filed Feb. 9, 1965
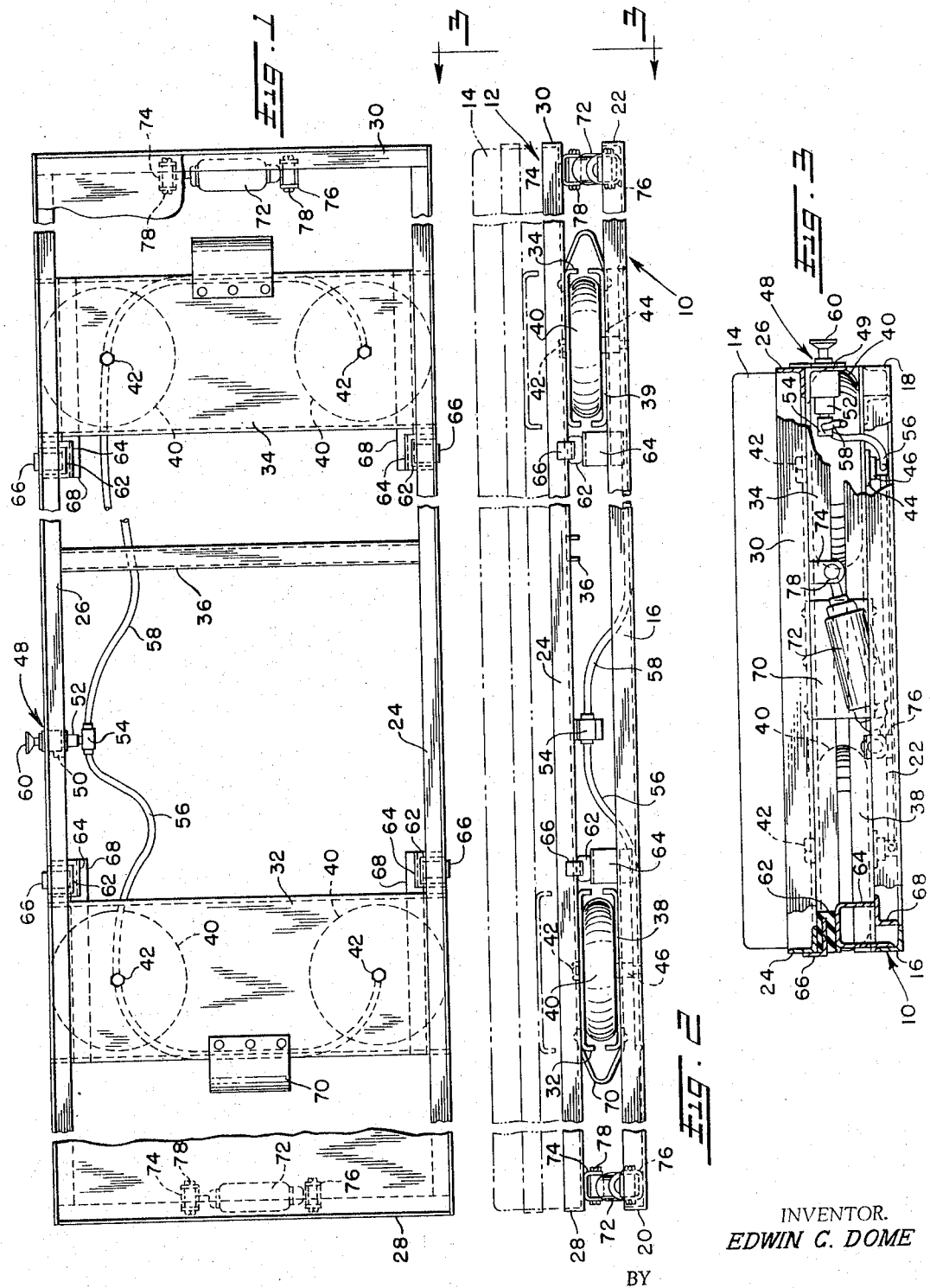
INVENTOR.
EDWIN C. DOME
BY
Oberlin, Maky & Donnelly
ATTORNEYS

United States Patent Office 3,299,447
Patented Jan. 24, 1967

3,299,447
SUSPENSION SYSTEM FOR MATTRESSES
AND THE LIKE
Edwin C. Dome, Lucas, Ohio, assignor to Artnell Company, Chicago, Ill., a corporation of Delaware
Filed Feb. 9, 1965, Ser. No. 431,291
4 Claims. (Cl. 5—118)

The present invention relates as indicated to a suspension system for mattresses and the like and relates more particularly to an adjustable suspension system for adjustably supporting the relatively shallow mattresses in common use in cabs of trucks or like vehicles.

In the trucking industry it has become common practice, owing to the rigorous time schedules which must be followed, convenience, cost consideration and other factors, for the driver to make provision for sleeping in the vehicle cab during trips of relatively long duration. The space normally used for such sleeping is found immediately behind the back of the driver's seat and comprises a platform of sufficient dimension to receive the driver while in a stretched position. As will be appreciated, the platform is generally relatively hard, and heretofore the mattresses available for such area have not proved entirely satisfactory.

It is accordingly a primary object of the present invention to provide a mattress and suspension system therefor constructed and arranged for disposition in the relatively confined area of the truck cab immediately behind the driver's seat.

A more specific object of the present invention is to provide such a suspension system which supports the mattress by means of a plurality of fluid springs, with the latter being adjustably inflatable to provide the desired degree of supporting hardness for the particular driver using the same.

A further object of the present invention is to provide such a suspension system which is simply constructed, inexpensive, and convenient to use.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a top plan view of the suspension system, with the mattress being removed to expose the system components;

FIG. 2 is a side elevational view of the suspension system, with the mattress being positioned thereon and shown in solid and dashed lines in its lower and upper positions of adjustment, respectively, and FIG. 3 is an end view, slightly enlarged, and partially fragmentary, of the mattress and suspension system, looking in the direction indicated by line 3—3 of FIG. 2.

Referring now in more detail to the drawings, wherein like parts are indicated by like reference characters, the suspension system of the present invention comprises a bottom frame assembly generally indicated at 10 and a top frame assembly generally indicated at 12, with the latter being adapted to receive a mattress 14, shown in dashed lines in FIGS. 2 and 3. The bottom frame assembly 10 comprises a pair of longitudinally extending side members 16 and 18 and a pair of end members 20 and 22 which are rigidly secured to the longitudinal frame members in any suitable manner thereby to form therewith a rigid, rectangular box frame. Each of the respective side and end frame members is generally L-shaped in cross section, and includes a bottom, horizontal, inwardly directed leg portion.

The top frame assembly 12 is generally similar to the bottom frame assembly 10 just described, with the top frame assembly comprising longitudinally extending side frame members 24 and 26 and end frame members 28 and 30 secured thereto thereby to provide a rigid frame assembly. The external dimensions of the top frame assembly preferably correspond to the dimensions of the bottom frame assembly. The respective side and end frame members of the top frame assembly 12 are similarly generally L-shaped in cross-section and include horizontal, inwardly directed leg portions which are adapted to receive and support the mattress 14. The mattress 14 is further supported by transversely extending, generally channel-shaped panels 32, 34 and 36 which extend between and are secured to the longitudinal side frame members 24 and 26 of the upper frame assembly 12. The upper surfaces of the mattress supporting panels are preferably coplanar with the horizontal leg portions of the respective side and end frame members of the upper frame assembly thereby to provide a flat supporting surface for the mattress 14.

A pair of lower channel-shaped supporting panels 38 and 39 are disposed vertically below the supporting panels 32 and 34 and extend transversely between and are secured to the longitudinal side frame members 16 and 18 of the bottom frame assembly 10. Each vertically aligned pair of upper and lower supporting panels are adapted to receive therebetween and support a pair of transversely spaced, preferably elastomeric fluid spring members commonly designated at 40. Each of the fluid spring members 40 is secured to the respective upper and lower supporting panels, with mounting bolts commonly designated at 42 serving to mount the upper end of the fluid springs to the top panels 32 and 34 and lock nuts commonly designated at 44 serving to securely mount the lower end of the fluid springs to the bottom support panels 38 and 39. The lock nuts 44 in the form shown threadedly engage downwardly extending nipples 46 the opposite ends of which are adapted to receive flexible fluid conduit means for supplying air to the respective fluid springs.

The air supplied to the respective fluid springs is controlled by means of a control valve generally indicated at 48 mounted on the top frame assembly 12 by means of an L-shaped mounting bracket 49, the top horizontal leg of which is mounted on the underside of the inwardly directed horizontal leg portion of the frame member 26, as best seen in FIG. 3. The control valve 48 includes an air inlet 50 and an outlet 52. A generally T-shaped fitting 54 is mounted on the outlet 52, with the opposite ends of the top of the fitting 54 communicating respectively with flexible air supply hoses 56 and 58. The air hoses 56 and 58 communicate serially with the nipples 46 of the fluid springs 40, with the connection of the air supply hose at the respective nipples being made in any suitable manner. The air control valve 48 further includes a control button 60 which is movable between two positions of adjustment for permitting inflation or deflation of the fluid spring members.

In the invention thus far described, then, it will be seen that the top frame assembly 12 and the mattress supported thereon can be quickly and simply vertically adjusted by controlling the air pressure within the respective fluid spring members 40 through the air control valve 48. Thus, the greater the degree of inflation of the fluid springs, the "harder" the mattress suspension will become. The driver can thus properly regulate the air inflation to achieve the desired support condition.

Means are provided for limiting the vertical movement of the top frame assembly 12 and the mattress 14 supported thereon, relative to the bottom fixed frame assembly 10. Referring to FIG. 3, downward vertical movement of the top frame assembly is limited by means of a plurality of rubber stop members commonly designated at 62 which contact, when the top frame assembly 12 is in its lowest position of adjustment, generally U-shaped stop brackets commonly designated at 64 fixedly secured to the side frame members 16 and 18 of the bottom frame assembly 10. Each of the preferably rubber stop members 62 is carried by an L-shaped bracket 66, the vertical leg of which, referring to FIG. 3, is mounted on the exterior face of the associated side frame member 24 or 26 of the top frame assembly. The inner leg of each of the generally U-shaped support brackets 64 is supported by and secured to an L-shaped supporting bracket 68 which is mounted below the associated bottom supporting panel 38 or 39. The brackets 68, as best seen in FIG. 1, extend beyond the sides of the panels 38 and 39 for supporting the stop brackets 64. In the form shown there are four stop members and associated stop brackets provided, although it will be apparent that a varying number could satisfactorily be employed.

Associated with each vertically aligned pair of upper and lower supporting panels is a flexible, preferably metal, spring-like web member 70. Each of the web members 70 is mounted at its respective ends by rivet means or the like to the upper and lower supporting panels whereby the opposed leg portions of such web members are subject to the same relative vertical movement resulting from adjustment of the fluid springs 40. As the top frame assembly 12 is vertically raised through inflation of the fluid springs 40, the legs of each of the web members 70 become increasingly more divergent and consequently more resistive to further relative movement between the top and bottom frame assemblies. The web members 70 are constructed so as to limit the vertical upward movement of the top frame assembly 12 and the mattress 14 to approximately the position indicated in dashed lines in FIG. 2.

Shock absorbers commonly designated at 72 are provided operatively disposed between the top and bottom frame assemblies 12 and 10, respectively, for dampening the relative vertical movement therebetween. Each of the shock absorbers 72 is mounted at its upper end by means of a generally U-shaped bracket 74 secured to the adjacent end frame member 28 or 30 of the top frame assembly, and at its bottom end by a similarly generally U-shaped mounting bracket 76 secured in any suitable manner to the end frame members 20 or 22 of the bottom frame assembly 10. Pin connections 78 secure the opposite end connections for the shock absorbers to the respective mounting brackets.

The present invention thus provides a simply constructed mattress suspension system which is easily adjustable to the desired condition of firmness by inflation of the respective fluid springs 40. The fluid springs can be inflated by any conveniently accessible air source such as air hoses commonly found in gas stations and like environments. The provision of four such fluid springs in the positions illustrated provides a stable suspension system having a relatively flat top surface and eliminates any tendency of the mattress or the top frame assembly to tilt relative to the lower frame assembly. Stop means are provided to predeterminedly limit the vertically upward and downward movement of the top frame assembly 12 to prevent extreme conditions of inflation of the fluid springs.

Although, as will be understood, the external dimensions of the mattress and suspension system will be governed by the particular space requirements, in the form shown the transverse and longitudinal dimensions are approximately 20 and 78 inches, respectively, with the range of vertical adjustability being approximately 2 inches. Obviously no limitations are intended in such dimensional figures, and the same have been given only by way of example to indicate dimensional and adjustment measurements which have proved highly satisfactory in use.

Other modes of applying the principle of the invention may be employed, change being made as regards the details described, provided the features stated in any of the following claims or the equivalent of such be employed.

I therefore particularly point out and distinctly claim as my invention:

1. A suspension system for mattresses and the like, comprising a generally rectangular bottom frame assembly, a generally rectangular top frame assembly adapted to receive and support a mattress or the like, a plurality of expansible fluid spring members structurally interposed between and having upper and lower end portions connected respectively to said top and bottom frame assemblies relatively adjacent each corner thereof, means for variably controlling the fluid pressure simultaneously within said plurality of fluid spring members to control the position of said top frame assembly, means for limiting the vertical upward and downward movement of said top frame assembly relative to said bottom frame assembly, and shock absorber means operatively connected to said top and bottom frame assemblies at each end thereof to dampen the movement of said top frame assembly.

2. The suspension system of claim 1 wherein said means for limiting the vertical upward movement of said top frame assembly comprises a pair of flexible web members operatively connected to said top and bottom frame assemblies.

3. A suspension system for mattresses and the like, comprising a generally rectangular bottom frame assembly, a generally rectangular top frame assembly adapted to receive and support a mattress or the like, a pair of support panel means mounted on said top frame assembly and extending transversely thereof relatively adjacent each end thereof, a pair of support panel means mounted in said lower frame assembly in vertical alignment with said top support panel means, a plurality of expansible fluid spring members structurally interposed between and having upper and lower end portions connected respectively to said support panel means mounted on said top and bottom frame assemblies, means for variably controlling the fluid pressure simultaneously within said plurality of fluid spring members to control the position of said top frame assembly, means for limiting the vertical upward and downward movement of said top frame assembly relative to said bottom frame assembly, and shock absorber means operatively connected to said top and bottom frame assemblies at each end thereof to dampen the movement of said top frame assembly.

4. The suspension system of claim 3 wherein said means for limiting the vertical upward movement of said top frame assembly comprises a pair of flexible web members operatively connected to said support panel means carried by said top and bottom frame assemblies.

References Cited by the Examiner
UNITED STATES PATENTS

| | | | |
|---|---|---|---|
| 1,664,129 | 3/1928 | Pallenberg | 5—278 X |
| 2,049,551 | 8/1936 | Van Dresser | 267—84 |
| 2,485,199 | 10/1949 | Holtzman | 5—246 |
| 2,769,182 | 11/1956 | Nunlist | 5—72 X |
| 2,897,520 | 8/1959 | Bradford | 5—348 |
| 3,067,437 | 12/1962 | Campbell | 5—118 |

FRANK B. SHERRY, *Primary Examiner.*

R. D. KRAUS, *Assistant Examiner.*